United States Patent [19]

Hiratsuka et al.

[11] Patent Number: 5,387,988
[45] Date of Patent: Feb. 7, 1995

[54] IMAGE SIGNAL PROCESSING APPARATUS AND IMAGE FORMATION APPARATUS INCLUDING THE SAME

[75] Inventors: Seiichiro Hiratsuka, Kitakyushu; Yoshitsugu Hayashi; Hiroshi Yamaguchi, both of Fukuoka, all of Japan

[73] Assignee: Matsushita Electric Industrial Co., Ltd., Japan

[21] Appl. No.: 55,552

[22] Filed: May 3, 1993

[30] Foreign Application Priority Data

May 8, 1992 [JP] Japan .................................. 4-115708

[51] Int. Cl.$^6$ .............................................. H04N 1/46
[52] U.S. Cl. ...................................... 358/515; 358/518
[58] Field of Search ............... 358/461, 475, 430, 424, 358/423, 518, 515

[56] References Cited

U.S. PATENT DOCUMENTS

| | | | |
|---|---|---|---|
| 5,065,234 | 12/1991 | Hung et al. | 358/523 |
| 5,079,624 | 1/1992 | Sasuga et al. | 358/530 |
| 5,187,570 | 2/1993 | Hibi et al. | 358/515 |

Primary Examiner—Stephen Brinich
Attorney, Agent, or Firm—Parkhurst, Wendel & Rossi

[57] ABSTRACT

An image processing apparatus for converting red, green, and blue luminance signals into cyan, magenta, and yellow density signals comprises: a first signal processing circuit for producing the cyan density signal from the red luminance signal; a second signal processing circuit for producing the magenta density signal from the green luminance signal and the cyan density signal; and a third signal processing circuit for producing the yellow density signal from the blue luminance signal, the cyan signal, and the magenta signal. Each of signal processing circuits comprises one or more lookup tables. The table of the second signal processing circuit may include the function of the first signal processing circuit and is supplied with red and green luminance signals. The third signal processing circuit has first and second tables. The first table responds to the cyan density signal and the blue luminance signal. The second table responds to the magenta density signal and the result of the first table. An image formation apparatus including the image signal processing apparatus mentioned above is disclosed also.

10 Claims, 8 Drawing Sheets

IMAGE SIGNAL PROCESSING APPARATUS AND IMAGE FORMATION APPARATUS INCLUDING THE SAME

BACKGROUND OF THE INVENTION

1. Field of the Invention

This invention relates to an image signal processing apparatus for processing red, green, and blue color signals to supply yellow, magenta, and cyan signals used for color recording and an image formation apparatus including the same.

2. Description of the Prior Art

An image processing apparatus for processing R (red), G (green), and B (blue) color signals obtained from a color scanner, or the like to supply Y (yellow), M (magenta), and C (cyan) signals used for color recording is known and is used in a color printer or a color copy apparatus. FIG. 7 is a general block diagram of a prior art color recording apparatus having a prior art image signal processing apparatus. A digital color video data output unit 1 supplies digital color video signals R, G and B to an image signal processing apparatus 2 which processes the supplied digital color video signals R, G, and B and sends the processed digital color video signals to a color recording unit 3. The color recording unit 3 records the digital color video signals.

The digital color video signals supplied to the image signal processing apparatus 2 are R (red), G (green), and B (blue) signals indicative of luminances of R, G, and B components of the color video signal to be recorded, namely, the R, G, and B luminance data. These R, G, and B signals are converted into red, green, and blue density data by a density conversion unit 4. The red, green and blue density data are supplied to a color correction unit 5 which effects a masking processing. The color-corrected density data are subjected to a tone processing provided for compensating characteristics of the color recording unit 3 in a tone processing unit 6 and sent to the color recording unit 3.

If the color recording is carried out after converting the R, G, and B luminance data of three additive primary colors used in a color display or the like into three subtractive primary colors used in a color printer or the like through an equivalent correspondence therebetween, hue of the recorded color in the resultant color hard copy decreases. The reason why the decrease in hue is that colorants (toners) of cyan, magenta, and yellow have light absorbing characteristics in the other spectrum band than R, G, and B. For example, an ideal magenta colorant has an absorbing spectrum band at only green. In fact, magenta colorants show the absorbing characteristic considerably at spectrum bands of blue. The processing for compensating of this decrease in hue is referred to as a color correction which is effected by the color correction unit 5. A linear masking (one dimensionally masking) has been mainly used for such color correction. The linear masking is given by:

$$\begin{Vmatrix} C \\ M \\ Y \end{Vmatrix} \begin{Vmatrix} T1 & T2 & T3 \\ T4 & T5 & T6 \\ T7 & T8 & T9 \end{Vmatrix} \times \begin{Vmatrix} Dr \\ Dg \\ Db \end{Vmatrix} \quad (1)$$

wherein Dr, Dg, Db are density data of red, green, and blue respectively; C, M, and Y are density data of cyan, magenta, and yellow colorants respectively; and T1 to T9 are matrix elements.

FIG. 8 is a block diagram of a prior art color correction unit 5 for effecting color correction represented by the EQ. (1). The density data Dr, Dg, and Db supplied from the density converting unit 4 is multiplied by the matrix elements T1 to T9 with multipliers 7A to 7I. Adders 8A to 8C add three results to provide density data of cyan, magenta, and yellow respectively.

The prior art linear masking mentioned above can be provided with a simple circuit structure. However, there are only nine parameters, so that there is a problem that the reproducing accuracy of color correction is not sufficient for the color printer.

Another prior art color correction employing a look-up table method with a large scale three-dimensional table provided for improving the reproduction quality of color through the color correction is known. The table requires a memory of 16 megabytes when the R, G, and B data are represented by eight bits respectively because the color correction is executed with three eight bit data, so that $2^8 \times 2^8 \times 2^8$ bits are required for each color and the total capacity of the memory is 48 megabytes. Therefore, there is problem that such large capacity memory increases the cost of the apparatus.

SUMMARY OF THE INVENTION

The present invention has been developed in order to remove the above-described drawbacks inherent to the conventional image processing apparatus and image formation apparatus including the same.

According to the present invention there is provided an image processing apparatus for converting red, green, and blue luminance signals into cyan, magenta, and yellow density signals, the image processing apparatus comprising: a first Signal processing circuit for producing the cyan density signal from the red luminance signal; a second signal processing circuit for producing the magenta density signal from the red and green luminance signals; and a third signal processing circuit for producing the yellow density signal from the red, green, and blue luminance signals.

According to the present invention there is provided an image processing apparatus for converting red, green, and blue luminance signals into cyan, magenta, and yellow density signals, the image processing apparatus comprising: a first signal processing circuit for producing the cyan density signal from the red luminance signal; a second signal processing circuit for producing the magenta density signal from the green luminance signal and the cyan density signal; and a third signal processing circuit for producing the yellow density signal from the blue luminance signal, the cyan signal, the magenta signal. Each of signal processing circuits comprises one or more look-up tables.

According to the present invention there is further provided an image formation apparatus for forming a color image from red luminance, green luminance, and blue luminance signals, the image formation apparatus comprising: an image processing apparatus for converting the red, green, and blue luminance signals into cyan, magenta, and yellow density signals, the image processing apparatus having: a first signal processing circuit for producing the cyan density signal from the red luminance signal; a second signal processing circuit for producing the magenta density signal from the red luminance signal and the green luminance signal; and a third signal processing circuit for producing the yellow density signal from the red luminance, green luminance, and blue luminance signals; and an image forming unit for forming a color image from the cyan, magenta, and yellow density signals.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described a first embodiment of this invention with reference to drawings.

Figure 1:
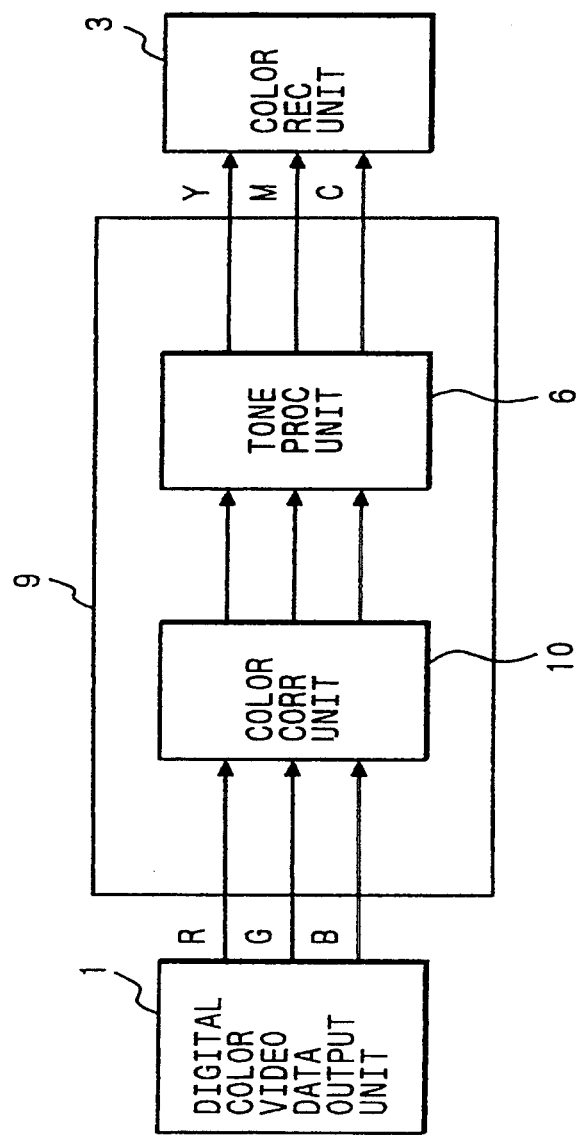
FIG. 1 is a general block diagram of this embodiment of an image processing apparatus of this invention.

FIG. 1 is a general block diagram of the first embodiment of an image processing apparatus of this invention.

A digital color video data output unit 1 supplies digital color video signals (data) R, G, and B to an image signal processing apparatus 9 which processes the supplied digital color video signals and sends the processed digital color video signals, namely, yellow, magenta, and cyan signals Y, M, and C indicative of densities of subtractive primaries to a color recording unit 8. The color recording unit 3 records the digital color video signals. The digital color data output unit 1 outputs video data which may be obtained from video data or a video signal supplied from an image scanner or a video camera through the A/D converting and a well-known video processing; video data once stored in a memory; or video data received from a communication unit via an interface unit. The image processing apparatus 9 including a color correction unit 10 for color-correcting the color video data and a tone processing unit 6 for effecting a tone processing. The color recording unit 3 outputs a reproduced color image from the color video signals from the image processing apparatus 9.

Figure 2:
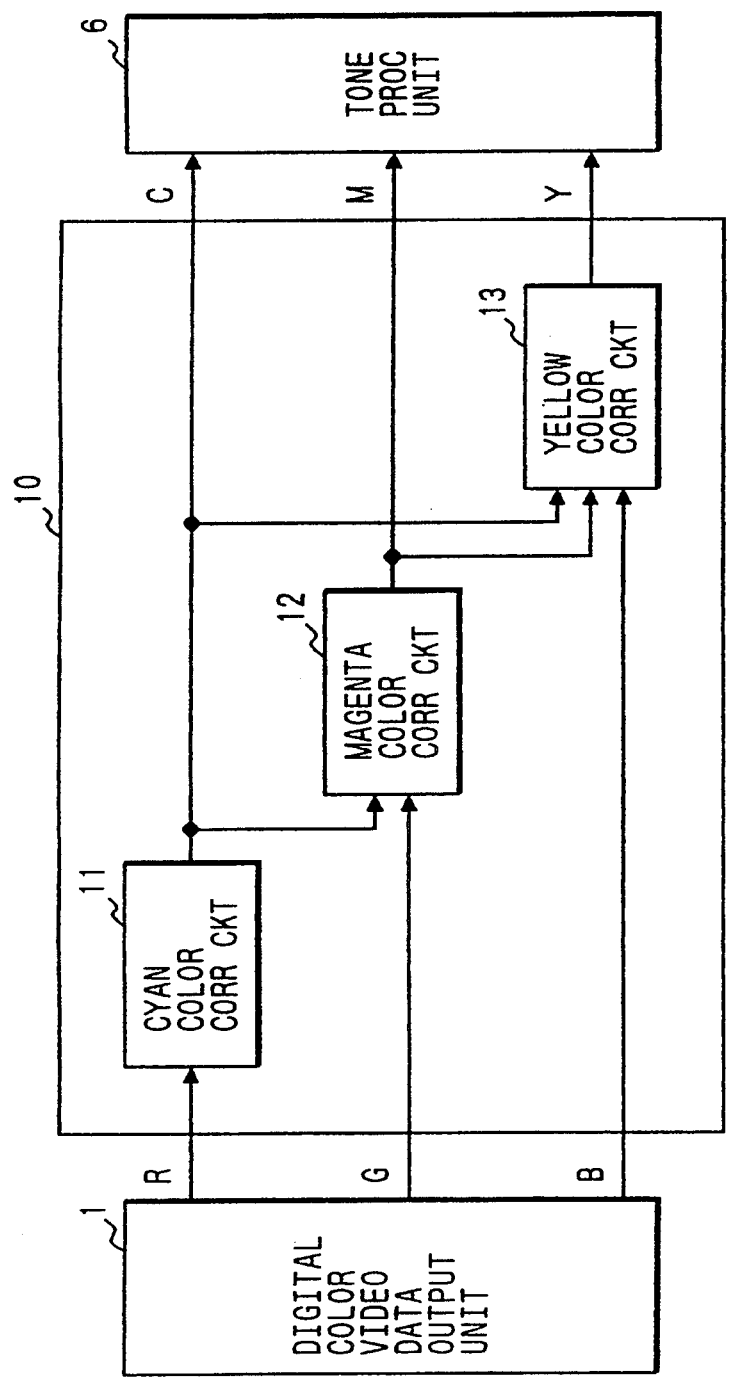
FIG. 2 is a block diagram of this embodiment of a color correction unit shown in FIG. 1.

FIG. 2 is a block diagram of the first embodiment of a color correction unit 10 shown in FIG. 1. A red (R) color signal is supplied to a cyan color correction circuit 11 to produce a cyan signal C. A magenta color correction circuit 12 is supplied with the cyan signal and a green (G) color signal to produce a magenta signal. A yellow color correction circuit 13 is supplied with the cyan signal C, the magenta signal M, and a blue (B) signal to produce a yellow signal Y.

Hereinbelow will be described color correction effected in this embodiment.

A relation between an output reflectance and an amount of colorant (toner) per unit area in consideration with a surface reflection is given by:

$$P=(Q-E)\exp(-A \cdot W)+E =Q\exp(-A \cdot W)+E(1-\exp(A \cdot W)) \quad (2)$$

wherein P is the output reflectance; Q is a reflectance of a paper for recording; A is an absorption coefficient; W is an amount of colorant per unit area; and E is a reflectance when the amount of colorant is infinite.

In the color recording, three primary color images are printed with overlaying on the paper. When the primary color images are printed in order of yellow, magenta, and cyan, the relation between the output reflectance and the amount of the colorants when these three colorants are overlaid is given by:

$$P=[\{Q\exp(-Ay \cdot Y)+Ey(1-\exp(-Ay \cdot Y))\}x \exp(-Am \cdot M)+Em(1-\exp(-Am \cdot M))]x \exp(-Ac \cdot C)+Ec(1-\exp(-Ac \cdot C)) \quad (3)$$

wherein Ay, Am, and Ac are absorption coefficients of yellow, magenta, and cyan; Y, M, and C are the amounts of colorants of yellow, magenta, and cyan respectively; Ey, Em, and Ec are reflectances when amounts of the yellow, magenta, and cyan colorants are infinite. Eq. (3) is applicable to light having any wavelength, so that models of three primary colors R, G, and B are respectively given by:

$$B=[\{Q\exp(-Ayb \cdot Y)+Eyb(1-\exp(-Ayb \cdot Y))\}x \exp(-Amb \cdot M)+Emb(1-\exp(-Amb \cdot M))]x \exp(-Acb \cdot C)+Ecb(1-\exp(-Acb \cdot C)) \quad (4)$$

$$G=[Q\exp(-Amg \cdot M)+Emb(1-\exp(-Amg \cdot M))]x \exp(-Acg \cdot C)+Ecg(1-\exp(-Acg \cdot C)) \quad (5)$$

$$R=Q\exp(-Acr \cdot C)+Ecr(1-\exp(-Acr \cdot C)) \quad (6)$$

The model of reflectance B of blue light is given by EQ. (4) wherein the suffix b of the absorption coefficient of blue means that the coefficient is for blue, namely, Ayb, Amb, and Acb are absorption coefficients of blue light with respect to yellow, magenta, and cyan colorants respectively; Y, M, and C are amount of yellow, magenta, and cyan colorants per unit area; Eyb, Emb, Ecb are reflectances for blue light when the amounts of the yellow, magenta, and cyan colorants are infinite.

The model of reflectance G of green is given by EQ. (5) because the absorption coefficient Ayg of green light with respect to the yellow colorant is negligible. The suffix g of the absorption coefficient of green means that the coefficient is for green, namely, Amg, and Acg are absorption coefficients of green light with respect to magenta, and cyan colorants; M, and C are amount of colorant of magenta, and cyan colorants per unit area respectively; Emg, and Ecg are reflectances for green light when the amounts of the magenta, and cyan colorants are infinite.

Because absorption coefficients Ayr and Amr with respect to yellow and magenta colorants are negligible, so that the reflectance R of red is given by EQ. (6). The suffix r of the absorption coefficient of red light means that the coefficient is for red light, namely, Act is absorption coefficient of red light with respect to cyan colorant; C is an amount of colorant of cyan per unit area; Ecr is reflectance for red light when the amount of the cyan colorant is infinite.

The color correction is performed with conversion of the three additive primary color light R, G and B into three subtractive primary colors C, M, and Y. Therefore, C, M, and Y are obtained from three primary color light R, G, and B through Eqs. (4) to (6) respectively. Eq. (6) is resolved with respect to cyan C as follows:

$$C = -\log\left(\frac{R - Ecr}{Q - Ecr}\right) \div Acr \tag{7}$$

Eq. (5) is resolved with respect to magenta M as follows:

$$M = -\log\left(\frac{\exp(Acg \cdot C)(G - Ecg) + Ecg - Emg}{Q - Emg}\right) \div Amg \tag{8}$$

Eq. (4) is resolved with respect to yellow Y as follows:

$$Y = -\log\left(\frac{\exp(Amb \cdot M)[\exp(Acb \cdot C)(B - Ecb) + Ecb - Emb] - Emb - Eyb}{Q - Eyb}\right) \div Ayb \tag{9}$$

The cyan color correction circuit 11 comprises a memory (not shown) including the function of Eq. 7 as a look-up table. The look-up table includes a set of data indicative of density data of cyan with correspondence to luminance data of red through the address of the data as shown in TABLE 1.

TABLE 1

| R (red) corresponding to memory address | C (cyan) corresponding to data |
| --- | --- |
| 0 | 255 |
| 1 | 253 |
| 2 | 250 |
| . | . |
| . | . |
| 254 | 2 |
| 255 | 1 |

The magenta color correction circuit 12 comprising a memory (not shown) including the function of Eq. 8 as a look-up table. The look-up table includes a set of data indicative of density data of magenta with correspondence to luminance data of green and cyan through the upper and lower addresses of the data respectively as shown in TABLE 2.

TABLE 2

| data of green corresponding to upper address | data of cyan corresponding to lower address | data of magenta corresponding to data in memory |
| --- | --- | --- |
| 0 | 0 | 255 |
| 0 | 1 | 253 |
| . | . | . |
| 0 | 255 | 220 |
| 0 | 0 | 254 |
| 1 | 1 | 252 |
| . | . | . |
| 1 | 255 | 216 |
| . | . | . |
| 255 | 0 | 25 |
| 255 | 1 | 20 |
| . | . | . |
| 255 | 255 | 0 |

Figure 3:
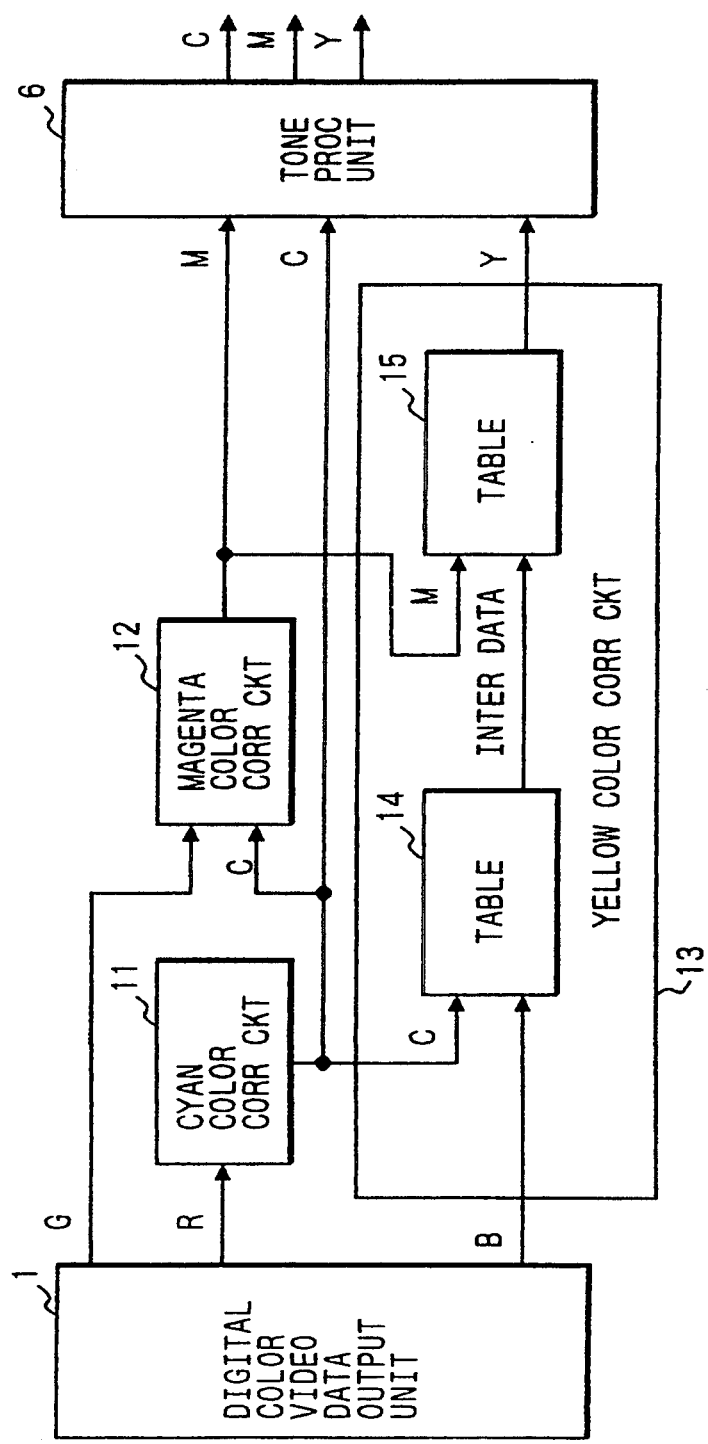
FIG. 3 is a block diagram of this embodiment of image processing circuit for showing a detail in a block of yellow color correction circuit shown in FIG. 1.

FIG. 3 is a block diagram of this embodiment of the image processing circuit for showing details in a block of yellow color correction circuit 13 shown in FIG. 2. The yellow color correction circuit 13 includes first and second tables 14 and 15. The first table 14 includes a function represented by EQ. (9) and is supplied with the data of blue and cyan to produce an intermediate result. The second table 15 is supplied with the intermediate result from the table 14 and data of magenta from the magenta color correction circuit 12 to produce a yellow density signal. These first and second tables 14 and 15 have the same structure as the magenta color correction circuit 12. That is, each table has two inputs, namely upper and lower address, and a set of data as shown in TABLE 2.

When the red data, green data, and blue data include eight bits respectively, the table in the cyan color correction circuit 11 requires 256 bytes because the cyan color correction circuit 11 effects color correction for the cyan density data on the basis of the red data, so that $2^8$ bits are required. The table in the magenta color correction circuit 12 requires 64 kilobytes because the magenta color correction circuit 12 effects color correction for the magenta density data on the basis of the green data and the cyan data, so that $2^8 \times 2^8$ bits are necessary. The table in the yellow color correction circuit 13 requires 128 kilobytes because the yellow color correction circuit 13 effects color correction for the yellow density data on the basis of the blue data, the cyan data and the magenta data, so that $2^8 \times 2^8 \times 2$ bits are required. Therefore, the total size of the memory is only 198.25 kilobytes and is considerably smaller than the memory of 48 megabytes required in the prior art color correction unit having three-dimensional look-up table.

The color-corrected cyan, magenta, and yellow signals in the color correction unit 10 are subjected to the tone correction in the tone processing unit 6. The tone-corrected cyan, magenta, and yellow signals are supplied to the color recording unit 3 which records the cyan, magenta, and yellow images in accordance with cyan, magenta, and yellow signals to produce a color hard copy with a high accuracy in color reproduction.

Hereinbelow will be described a second embodiment of this invention.

Figure 9:
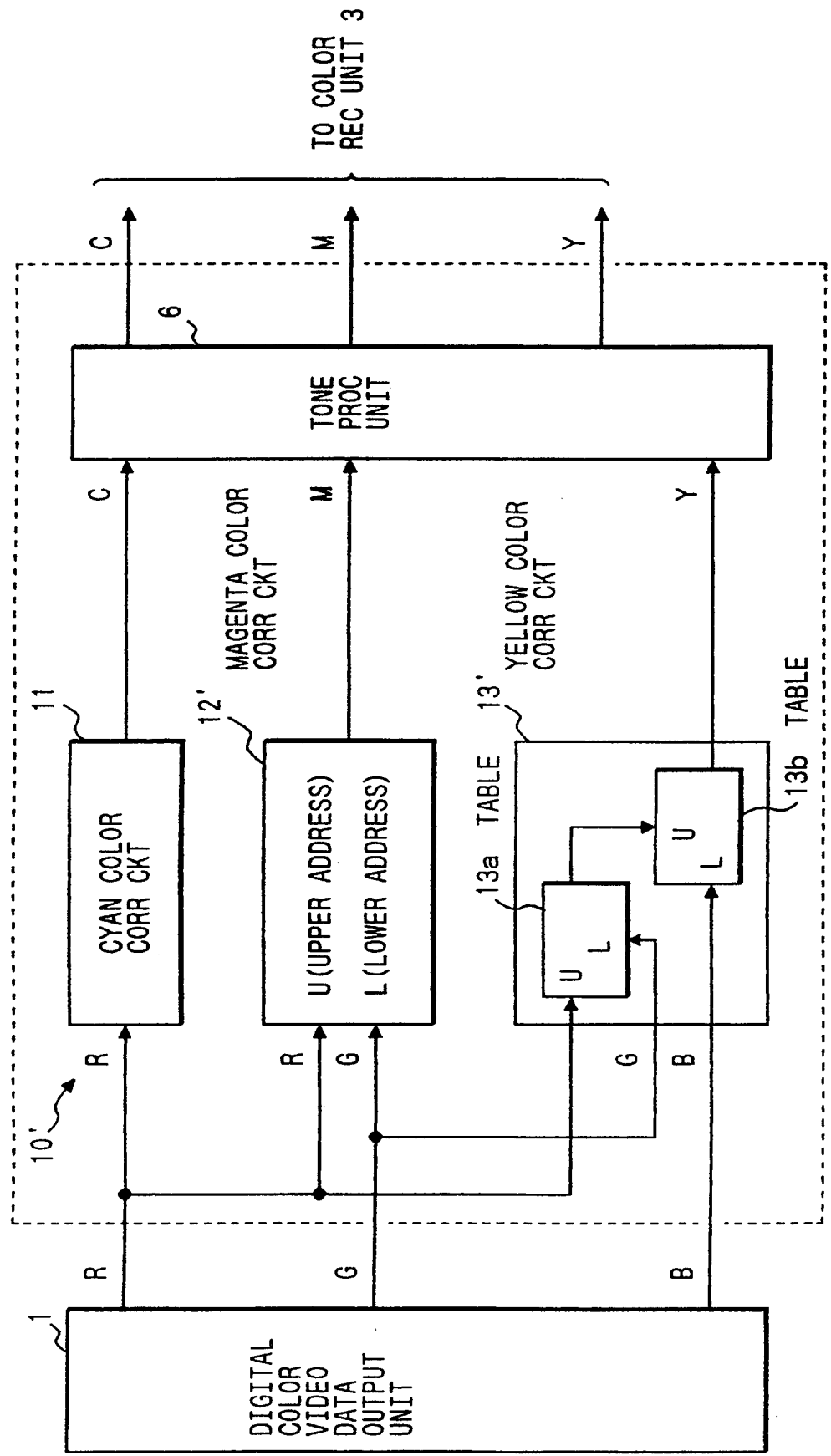
FIG. 9 is a block diagram of a second embodiment of an image processing apparatus of this invention.

FIG. 9 is a block diagram of a second embodiment of an image processing apparatus of this invention. In the first embodiment, as shown in FIG. 2, the magenta signal M is produced from the cyan signal from the cyan color correction circuit 11. However, it is possible that the function of the cyan color correction circuit 11 can be included in the magenta color correction circuit 12. Therefore, the magenta color correction circuit of the second embodiment is provided to have the function of the cyan color correction circuit also. Such a combined function including the function of the cyan color correction circuit 11 and the magenta color correction circuit 12' is provided by substituting the term "C" in EQ. (7) for the term "C" in EQ. (8) as follows:

$$M = -\log\left(\frac{\exp\left(Acg \cdot \left(-\log\left(\frac{R - Ecr}{Q - Ecr}\right) \div Acr\right)(G - Ecg) \div Ecg - Emg\right)}{Q - Emg}\right) \div Amg \qquad (10)$$

Similarly, the yellow color correction circuit of this embodiment 13' also includes the function of the cyan color correction circuit 11 and the magenta color correction circuit 12. Such a function including the functions of the cyan color correction circuit 11 and the magenta color correction circuit 12' is provided by substituting the term "C" in EQ. (7) for the term "C" in EQ. (9) and substituting the term "M" in EQ. (8) for the term "M" in EQ. (9) similarly.

In FIG. 9, the digital color data output unit 1 supplies digital color video signals R, G, and B to an image signal processing apparatus 9' which processes the supplied digital color video signals R, G, and B and sends the processed digital color video signals, namely, cyan, magenta, and yellow signals to the color recording unit 3 The color recording unit 3 records the digital color video signals. The image processing apparatus 9' includes a color correction unit 10' for color-correcting the color video data and tone processing unit 6 for effecting the tone processing. The color recording unit 3 outputs a reproduced color image from the color video signals from the image processing apparatus 9.

A red (R) color signal is supplied to the cyan color correction circuit 11 to produce the cyan signal. A magenta color correction circuit 12' is supplied with the red (R) signal and the green (G) color signal to produce a magenta signal. A yellow color correction circuit 13' is supplied with the red, green, and blue signals to produce a yellow signal Y.

The magenta color correction circuit 12' comprises a memory (not shown) as a table including data indicative of output magenta densities stored in correspondence with upper addresses (U) and lower (L) addresses. This is similar to the data Stored in the magenta color correction circuit 12. However, the data is prepared on the basis of EQ. (10). The yellow color correction circuit 13' comprises a table 13a to which the red and green signals are supplied to upper and lower addresses thereof for producing an intermediate result and a table 13b supplied with the intermediate result and the blue signal for producing yellow signal as follows.

The table 13a supplied with the red and green signals through the upper and lower addresses thereof produces the intermediate result and then, the table 13b supplied with the intermediate result and the blue luminance signal produces the yellow signal Y. The image processing apparatus of the second embodiment is also capable of reduction in the memory size.

Hereinbelow will be described the structure of the color recording unit 3 used in the first and second embodiments with reference to FIGS. 4 to 6.

Figure 4:
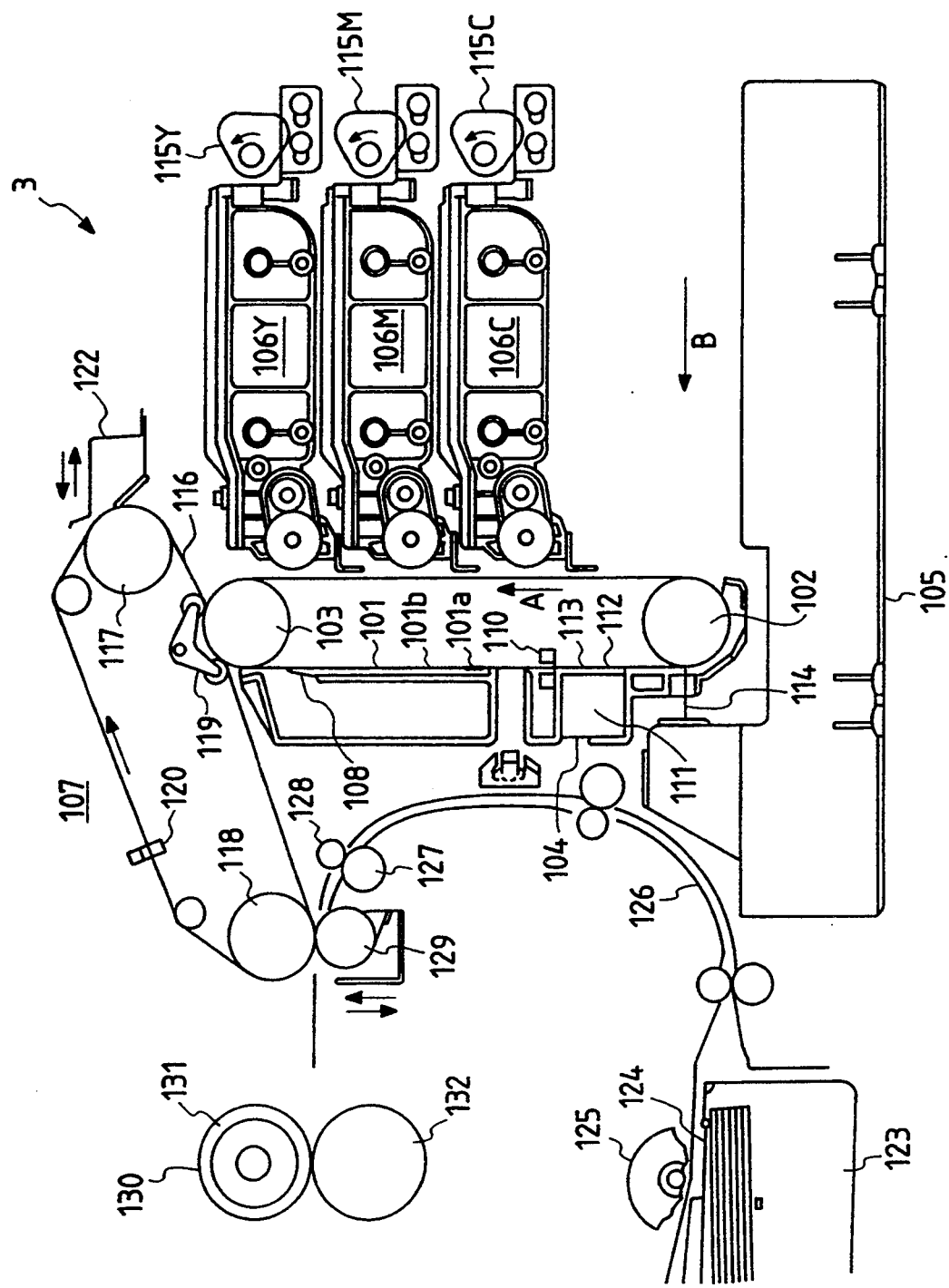
FIG. 4 is a side cross-sectional view of this embodiment of the color recording unit 3.

FIG. 4 is a side cross-sectional view of this embodiment of the color recording unit 3. FIGS. 5 and 6 are perspective views of this embodiment for partially showing the color recording unit 3.

In the color recording unit 3 for forming a color image employing a electrophotographic processing, an exposure beam is focused on a photosensitive member 101 having a photosensitive layer to form respective primary color electrostatic latent images. Each of the primary color electrostatic latent images is developed by each of the primary color toners of yellow, magenta, and cyan and the developed images are overlaid successively to form a color image.

In FIG. 4, the photosensitive member 101 having a photosensitive film formed of selenium (Se) or an organic photoconductive material (OPC) or the like formed on a circumference of a plastic belt forming a closed loop having a connection portion 101a. The photosensitive member 101 is supported with two rollers 102 and 108 with a tension to form vertical planes as shown and is circulated by a drive motor (not shown) through the roller 108 in the direction A. Around the photosensitive member 101, there are provided a charger 104, an exposure optical system 105, developers 106C, 106M, and 106Y; an intermediate transferring unit 107, a cleaning unit 108 for cleaning the photosensitive member 101; a discharging unit, and a position sensor 110 for detecting the reference position of the photosensitive member 101.

The charger 104 comprises a charging wire 11 made of tungsten or the like, a shield metal plate 112, and a grid plate 118. Application of a high voltage to the charging wire 111 develops corona discharging to uniformly charge the photosensitive member 101 through the grid plated 118. The exposure optical system 105 emits the exposure beam 114 for forming the latent images on the photosensitive member 101. The exposure beam 114 is produced by application of a laser drive signal obtained by the light intensity modulation or the pulse width modulation by a laser drive circuit (not shown) in accordance with the color signals Y, M, and C from the tone processing unit 6. The exposure beam 114 successively forms the primary color latent images to be developed with respective primary color toners.

Figure 5:
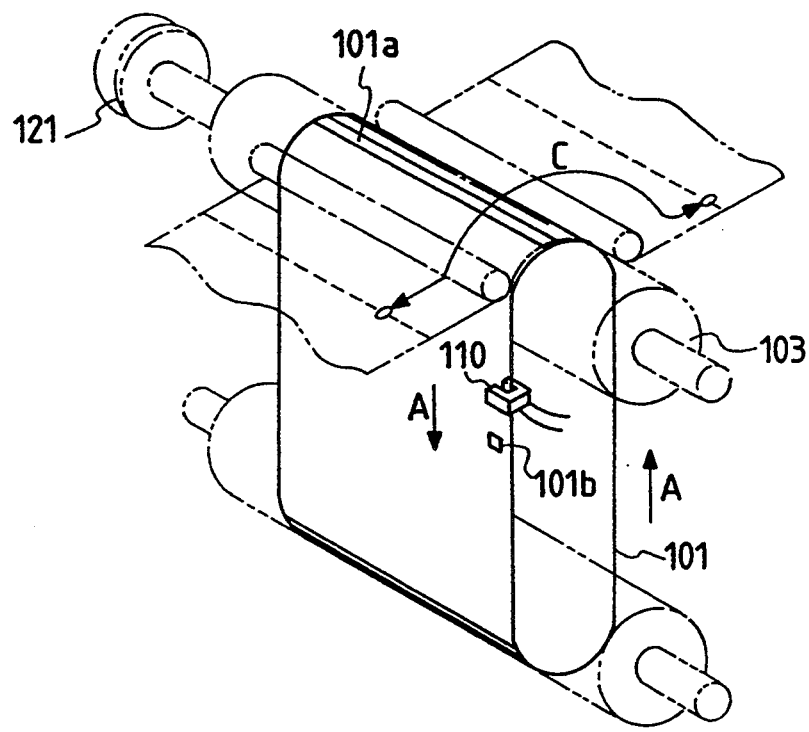
FIGS. 5 and 6 are perspective views of this embodiment for partially showing the color recording unit shown in FIG. 1.

As shown in FIG. 5, the position sensor 110 is provided for detecting the connection portion 101a of the photosensitive member 101. In fact, the position sensor detects an index mark 101b having a slit in the photosensitive member 101 to detect the connection portion 101a indirectly. In FIG. 4, respective color developers 106Y, 106M, and 106C contain primary color toners corresponding to respective color latent images to be developed. The selection of color of the toner used for development is done by contacting one of developers 106Y, 106M, and 106C with the photosensitive member 101 by driving the selected developer, for example, the developer 106C toward the photosensitive member 101 by selectively rotating cam 115C. During this the other developers 106Y and 106M are separated from the photosensitive member 101. The intermediate transferring unit 107 comprises an intermediate transfer member 116 formed in a loop belt made of a conductive plastic or the like, rollers 117 and 118 for supporting the intermediate transferring member 116, and an intermediate transferring roller 119 so arranged as to confront the photosensitive member 101 with the intermediate transferring member 116 superimposed therebetween. Here, an outer circumference length L1 of the photosensitive member 101 is determined such that it is substantially equal to an outer circumference length L2 of the intermediate transferring member 116. However, they are determined to keep a relation of $L1 \leq L2$ in consideration of a dispersion of these lengths.

Figure 6:
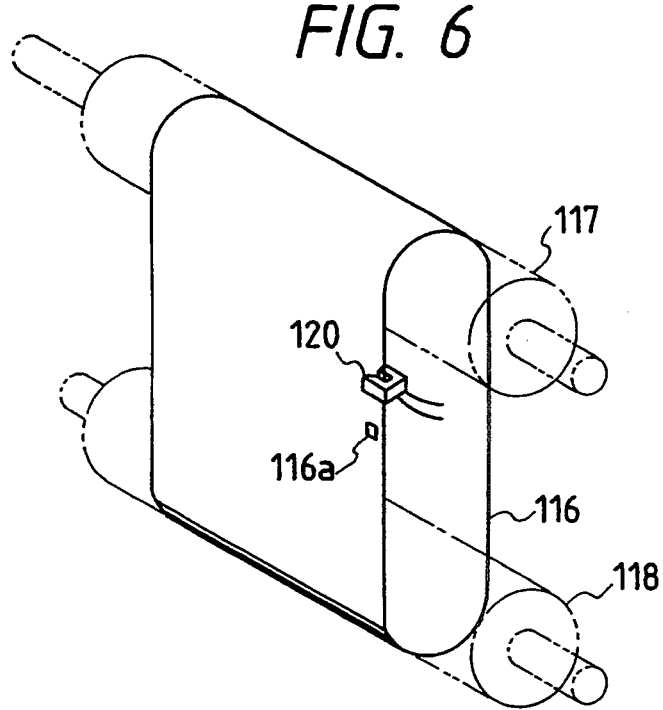
Figure 7:
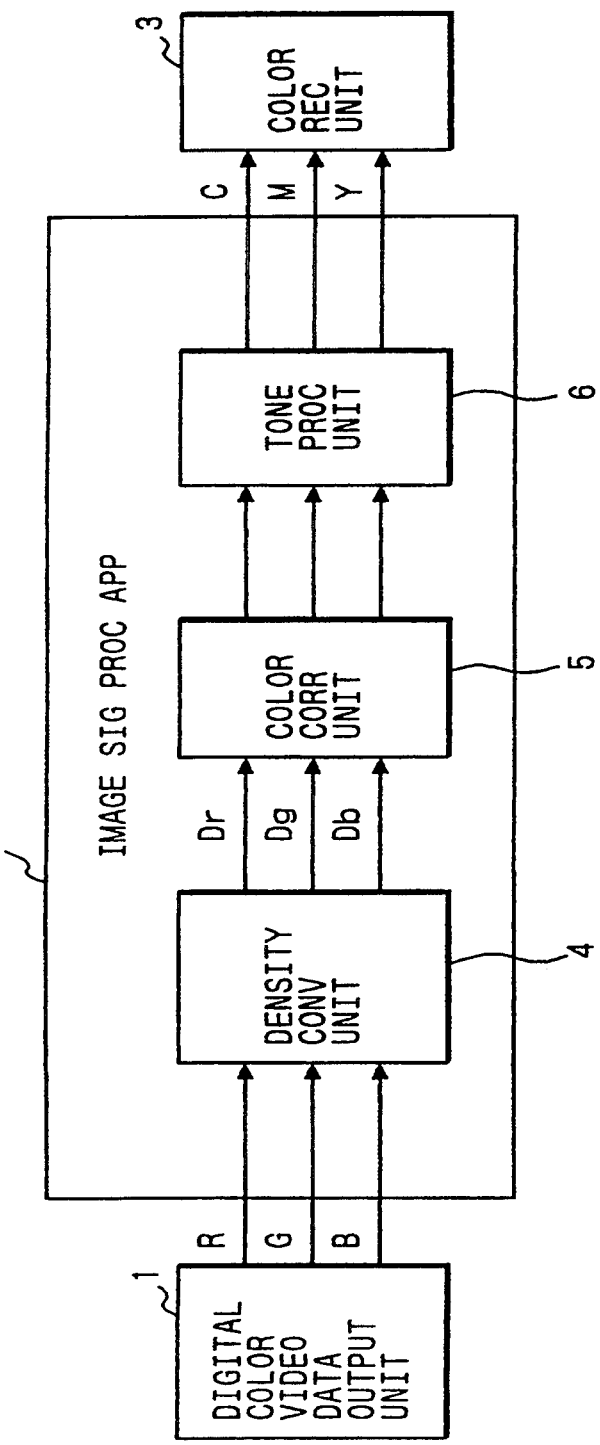
FIG. 7 is a general block diagram of a prior art color recording apparatus having a prior art image signal processing apparatus.
Figure 8:
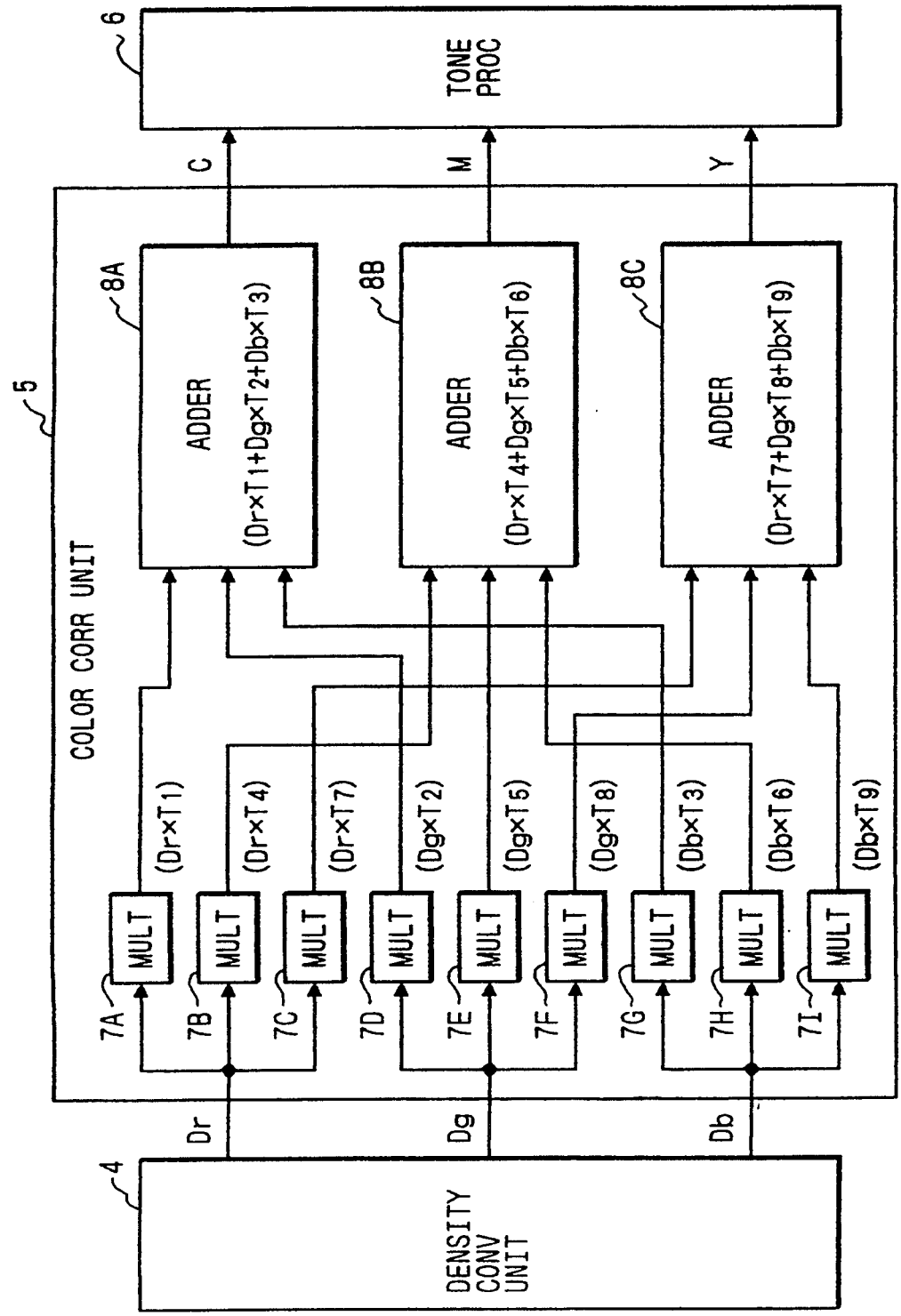
FIG. 8 is a block diagram of a prior art color correction unit.

In FIG. 6, numeral 120 denotes a position sensor for detecting a position of the intermediate transferring member 116. In fact, the position sensor 120 detects an index mark 116a having a slit in the intermediate transferring member 116 to detect its reference position. In FIG. 5, numeral 121 is a clutch mechanism of the photosensitive member 101 provided to a drive shaft of the roller 103 for connecting or disconnecting the roller 103 from a power from a drive source (not shown) to control of the circulation of the photosensitive member 101. In FIG. 4, numeral 122 is a cleaning unit for cleaning the remaining toner on the intermediate transferring member 116. It is separated from the intermediate transferring member 116 during the combing of color images on the intermediate transferring member 116 and contacts and engaged with the intermediate transferring member 116 during cleaning. Numeral 123 is a transferring material cassette, namely, a paper cassette, for containing transferring materials 124. Each sheet of transferring materials 124 is supplied to a paper transferring path 126 by a paper supplying roller 125 having a semicircle form from the transferring material cassette 123. Numeral 127 is a resist roller for stopping and waiting the transferring material 124 to agree the position of the transferring material 124 with that of the combined image formed on the intermediate transferring member 116 and contacts with a driven roller 128. Numeral 129 is a transferring roller for transferring a combined image formed on the intermediate transferring member 116 onto the transferring material 124. It contacts and rotates with the intermediate transferring member 111 only during transferring the combined images onto the transferring material 124. Numeral 130 is a fixing unit comprising a heat roller 131, having a heat source therein and a pressure roller 132, fixes the combined images transferred onto the transferring material 124 with a pressure and a heat on the transferring material 124 with rotation of the heat roller 131 and a pressure developed by the pressure roller 132 to form a fixed color image.

Hereinbelow will be described operation of the color printer having the structure mentioned above.

The photosensitive member 101 and the intermediate transferring member 116 are driven by drive sources respectively and their circular speeds are controlled to the same constant value. The image formation region on the intermediate transferring member 116 is controlled by position sensor 120 with reference to the index mark 116a for determining the reference position of the intermediate transferring member 16. The intermediate transferring member 16 is driven such that the image formation region does not contact with the connection portion 101a of the photosensitive member 101 at the roller 119.

In this state, the high voltage is applied to the charging wire 111 of the charger 104 connected to a high voltage source (not shown) to develop corona discharge to charge the surface of the photosensitive member 101 to about $-700$ V to $-800$ V uniformly. The photosensitive member 101 is circulated in the direction A and exposed to the exposure beam 114 of a laser beam modulated by one of primary color signals, for example, the cyan density signal. Portions on the photosensitive member 101 exposed to the exposure beam 114 releases the charge. That is, charges at high light portions are released. Therefore, an electrostatic latent image of a primary color is formed. The electrostatic latent image is formed at the image formation region on the photosensitive member 101 without the latent image striding over the connection portion 101a. On the other hand, the developer 106C containing the cyan toner for developing is driven in the direction B by rotation of the cam 115C by a color selection signal to contact with the photosensitive member 101. Then, on the electrostatic latent image is developed by sticking of the toner to the electrostatic latent image to form a toner image. The termination of development, the developer 106C is moved to a separated position from the contacting position with the photosensitive member 101 by rotation of the cam 115C by 180°. The toner image formed on the photosensitive member 101 by the developer 106C is transferred to the intermediate transferring member 116 by application of a high pressure to the contacting portion of the photosensitive member 101 and the intermediate transferring member 116 by the intermediate transferring roller 119 repeatedly to combine the primary color toner images. The remaining toner which is not transferred to the intermediate transferring member 116 from the photosensitive member 101 is removed by cleaner 108. The remaining charge on the photosensitive member 101 is removed by the discharging unit 109.

Then, for example, if the magenta color is selected for developing, the cam 115M rotates to drive the magenta developer 106M toward the photosensitive member 101 to contact with the photosensitive member 101 to start the development of the magenta image. In color copy apparatus or color printers which combine three colors to form a color image, the developing operation mentioned above is repeated three times for forming cyan, magenta, and yellow toner images overlaid on the intermediate transferring member 116. The combined images formed as mentioned above is transferred to transferring material 124 supplied from the transferring material cassette 123 along the paper transferring path 126 by contacting of transferring roller 129, which has been separated, with the intermediate transferring member 116 by application of a high pressure to the transferring roller 129. The transferring material 124 is sent to the fixing unit 130. The fixing unit fixes the transferred color image by the heat from the heat roller 131 and a pressure applied by the pressure roller 132 as an output color image.

Remaining toners on the intermediate transferring member 116 is removed by the cleaning unit 122. The cleaning unit 122 is separated from the intermediate transferring member 116 until the termination of forming a combined image and after transferring the combined image to the transferring material 124. It contacts with the intermediate transferring member 116 to remove the remaining toners. The recorded image, namely, color image, is obtained by completion of the operation mentioned above.

The structure mentioned above provides: conversion of three primary color luminance data (signal) of R, G, and B into three subtractive primary color (density) signals, namely, cyan, magenta, and yellow signals directly; non-linear conversion; reduction of memory capacity by obtaining the magenta signal;by effectively using the cyan signal and green signal and obtaining the yellow signal by effectively using cyan and magenta signals, so that there is a provided a color printer with a high accuracy in color reproduction at a low cost.

Moreover, in this invention, the model provided in accordance with EQ. (2) which is based on the surface reflection. However, there are possible another pattern of modes. Therefore, the model should not be limited to the model provided in accordance with Eq. (2).

Moreover, in this embodiment, the color correction processing is carried out with the look-up table. However it is also possible that the processing corresponding to EQs. 7 to 9 is effected by operational circuits.

What is claimed is:

1. An image processing apparatus for converting red, green, and blue luminance signals into cyan, magenta, and yellow density signals, said image processing apparatus comprising:
   (a) first signal processing means for producing said cyan density signal from only said red luminance signal;
   (b) second signal processing means for producing said magenta density signal from only said red and green luminance signals; and
   (c) third signal processing means for producing said yellow density signal from said red, green, and blue luminance signals.

2. An image processing apparatus as claimed in claim 1, wherein said third signal processing means comprises a first table for producing a color correction signal from said green and red luminance signals and a second table for producing said yellow density signal using said color correction signal and said blue luminance signal.

3. An image processing apparatus for converting red, green, and blue luminance signals into cyan, magenta, and yellow density signals, said image processing apparatus comprising:
   (a) first signal processing means for producing said cyan density signal from only said red luminance signal;
   (b) second signal processing means for producing said magenta density signal from only said green luminance signal and said cyan density signal produced by said first signal processing means; and
   (c) third signal processing means for producing said yellow density signal from said blue luminance signal, said cyan signal produced by said first signal processing means, said magenta signal produced by said second signal processing means.

4. An image processing apparatus as claimed in claim 3, wherein: said first signal processing means comprises a first color correction circuit; said first signal processing means produces said cyan density signal from said red luminance signal by using said first color correction circuit; said second signal processing means comprises a second color correction circuit; said second signal processing means produces said magenta density signal from said green luminance signal and said cyan density signal by using said second color correction circuit; said third signal processing means comprises a third color correction circuit; said third signal processing means produces said yellow density signal from said blue luminance signal, said cyan signal, and said magenta signal by using said third color correction circuit.

5. An image processing apparatus for converting red, green, and blue luminance signals into cyan, magenta, and yellow density signals, said image processing apparatus comprising:
   (a) first signal processing means for producing said cyan density signal from only said red luminance signal;
   (b) second signal processing means for producing said magenta density signal from only said green luminance signal and said cyan density signal produced by said first signal processing means;
   (c) third signal processing means for producing a color correction signal from said blue luminance signal and said cyan signal produced by said first signal processing means; and
   (d) fourth signal processing means for producing said yellow signal from said color correction signal and said magenta density signal produced by said second signal processing means.

6. An image processing apparatus for converting digital red, digital green, and digital blue luminance signals into digital cyan, digital magenta, and digital yellow density signals, said image processing apparatus comprising:
   (a) first storing means for storing a first set of data and for converting only said digital red luminance signal into said digital cyan density signal;
   (b) second storing means for storing a second set of data and for converting said digital green luminance signal and said digital cyan density signal into said magenta density signal;
   (c) third storing means for storing a third set of data and for converting said digital blue luminance signal and said digital cyan density signal into color correction data; and
   (d) fourth storing means for storing a fourth set of data and for converting said color correction data and digital magenta density signal into said yellow density signal.

7. An image formation apparatus for forming a color image from red luminance, green luminance, and blue luminance signals, said image formation apparatus comprising:
   (a) image processing means for converting said red, green, and blue luminance signals into cyan, magenta, and yellow density signals, said image processing apparatus having:
      first signal processing means for producing said cyan density signal from only said red luminance signal;
      second signal processing means for producing said magenta density signal from only said red luminance signal and said green luminance signal; and
      third signal processing means for producing said yellow density signal from said red luminance, green luminance and blue luminance signals; and
   (b) image forming means for forming a color image from said cyan, magenta, and yellow density signals.

8. An image formation apparatus for forming a color image from red luminance, green luminance, and blue luminance signals, said image formation apparatus comprising:
   (a) image processing means for converting said red, green and blue luminance signals into cyan, magenta and yellow density signals, said image processing apparatus including:

first signal processing means for producing said cyan density signal from only said red luminance signal;

second signal processing means for producing said magenta density signal from only said red luminance signal and said green luminance signal; and third signal processing means for producing said yellow density signal from said red luminance, green luminance and blue luminance signals; and (b) image forming means for forming a color image from said cyan, magenta and yellow density signals, wherein said image forming means sequentially overlays a yellow image formed from said yellow density signal, a magenta image formed from said magenta density signal, and a cyan image formed from said cyan density signal to form said color image.

9. An image formation apparatus for forming a color image from red luminance, green luminance, and blue luminance signals, said image formation apparatus comprising:

(a) image processing means image for converting said red, green, and blue luminance signals into cyan density, magenta density, and yellow density signals, said image processing apparatus comprising:

first signal processing means for producing said cyan density signal from only said red luminance signal;

second signal processing means for producing said magenta density signal from only said green luminance signal and said cyan density signal; and third signal processing means for producing said yellow density signal from said blue luminance signal, said cyan signal produced by said first signal processing means, and said magenta signal produced by said second signal processing means; and (b) image forming means for forming a color image form said cyan, magenta, and yellow density signals.

10. An image formation apparatus as claimed in claim 9, wherein said image forming means sequentially overlays a yellow image formed from said yellow density signal, a magenta image formed from said magenta density signal, and a cyan image formed from said cyan density signal to form said color image.

* * * * *